Oct. 23, 1951  W. M. FOLBERTH  2,572,254
RESPIRATOR
Filed Dec. 8, 1949
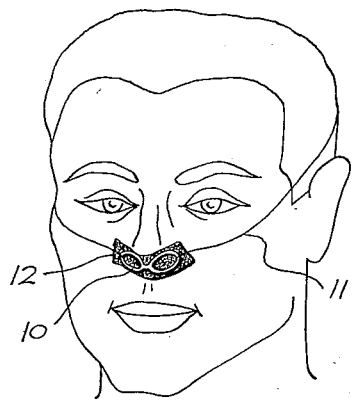
FIG. 1
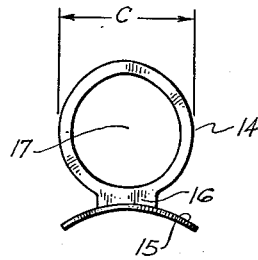
FIG. 4
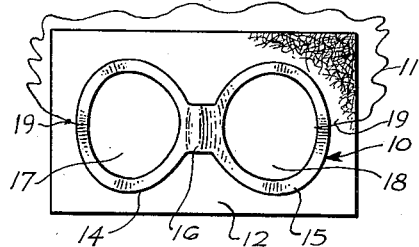
FIG. 2
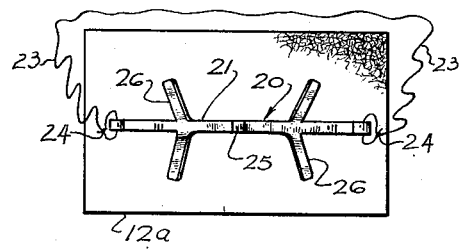
FIG. 5
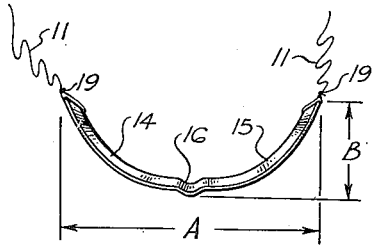
FIG. 3
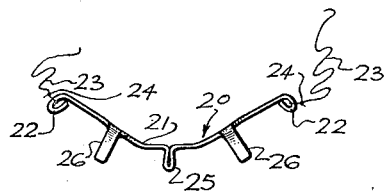
FIG. 6
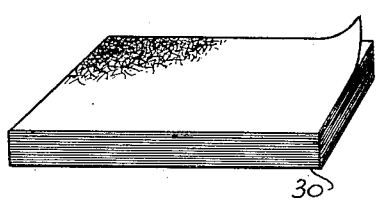
FIG. 8  FIG. 7
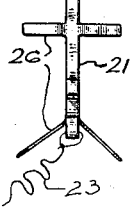
INVENTOR.
WILLIAM M. FOLBERTH
BY
Bosworth & Sessions

Patented Oct. 23, 1951

2,572,254

UNITED STATES PATENT OFFICE 2,572,254

RESPIRATOR

William M. Folberth, Cleveland, Ohio

Application December 8, 1949, Serial No. 131,720

7 Claims. (Cl. 128—148)

This invention relates to respirators, dust filters and the like and more particularly to a filter device adapted to protect the user from non-toxic dusts and other air-borne particles.

Many types of respirators, nasal filters and the like have been devised. So far as I am aware, these without exception have been subject to one or more of the following difficulties: They are uncomfortable; they interfere with vision; the filter elements are difficult to replace; the devices are expensive; they interfere with normal conversation; they irritate the nose or portion of the face with which they come in contact.

A general object of the present invention is the provision of simple, inexpensive respirators, nasal filters or the like in which all of the above noted difficulties are eliminated. More specific objects include the provision of very light and simple respirators which are effective in use yet which are hardly noticeable to the wearer; the provision of respirators in which the filter material can be changed with little difficulty and in a very short space of time; the provision of respirators in which different amounts of filter material can be used depending upon the severity of the conditions encountered; and the provision of respirators embodying extremely inexpensive replaceable filter elements.

Further objects and advantages of the invenwill become apparent from the following description of a preferred form thereof, reference being made to the accompanying drawings in which Figure 1 is a perspective view showing one form of my respirator in position upon the head of a user; Figure 2 is a view on an enlarged scale showing the respirator of Figure 1 removed from the user; Figure 3 is a side elevational view of the frame of the respirator shown in Figure 2; Figure 4 is an end elevational view of the frame of the respirator of Figure 2; Figure 5 is a front elevational view of a modified form of respirator; Figure 6 is a side elevation of the frame of the respirator of Figure 5; Figure 7 is an end elevation of the frame of the respirator of Figure 5; and Figure 8 is a somewhat diagrammatic illustration of a pack of the preferred filter material utilized with my respirators.

Preferably I accomplish the foregoing and other objects of my invention by providing respirators which consist only of a simple frame which may be composed of light metal, plastic or the like, and which are adapted to be disposed adjacent the nostrils of the user; a very light elastic band that encircles the user's head and holds the frame in position; and a flexible filter pad disposed between the frame and the user's nostrils and held in position solely by frictional engagement with the frame and the edges of the user's nostrils, the shape of the frame being such that most of the area of that portion of the filter pad that overlies the user's nostrils is open and unobstructed.

Referring now to Figures 1 to 4 of the drawings, one form of the frame is indicated in general at 10, the elastic band at 11, and the filter pad at 12. As shown in Figure 1, the frame 10 is held beneath the user's nostrils by the elastic band 11 with the filter pad 12 interposed between the frame and the user's nostrils. In the form of the invention shown in Figures 2, 3 and 4, the frame consists of two identical rim portions 14 and 15 which may be connected to each other tangentially or by means of a small web portion 16 adapted to be disposed beneath the center or web of the user's nose. The rims 14 and 15 define apertures 17 and 18 which are preferably a little larger than the user's nostrils; e. g., the dimension A (Figure 3) is somewhat greater than the width of the average nose, while the dimension C (Figure 4) is slightly less than the distance from lip to tip of the average nose. The rims 14 and 15 preferably do not entirely coincide with the edges of the user's nostrils; however, spaced portions of the rims underlie the edges of the user's nostrils and thus hold the filter pad in engagement with the edges of the nostrils at spaced points. This provides a valve action as described below and makes accurate fitting of the device unnecessary.

When the device is in use, the apertures 17 and 18 are blocked by the filter element or pad 12. The filter element 12 preferably is in rectangular sheet form and larger than the overall dimensions of the frame member so that no particular degree of care is necessary in properly positioning the filter element with respect to the frame.

In order to provide for a comfortable fit of the frame member with the user's nose, the frame 10 is bent along the web portion 16 as shown in Figure 3 so that the two rim portions 14 and 15 are angularly related to each other, making the frame upwardly concave in the direction of the length thereof; the rim portions 14 and 15 are curved as shown in Figure 4 to present surfaces which are upwardly convex in the transverse direction. Preferably, the frame is composed of light, ductile, corrosion resisting metal, such as aluminum, which the user can bend with his fingers to form the frame into a comfortable shape which will hold the filter pad in proper relationship with his nose.

The elastic band 11 is secured to the rims 14 and 15 in any suitable manner, such as by small knots 19 for holding the frame 10 in position, and is preferably made in the form of a thin elastic thread. Only slight pressure is necessary to hold the frame in position against the nostrils because of the nature of the filter pad, as will be explained more fully below. Hence, the band or thread 11 is preferably of such length and strength that the frame 10 and filter pad 12 are urged against the nostrils with a total force of about one ounce or even less. Elastic sewing thread having a diameter of about 1/64 inch and composed of a thin strand of rubber or the like covered with yarns composed of textile fibers is a satisfactory material for the band 11. The frame 10 as well as the filter pad 12 and elastic band 11 have negligible weight. Therefore the complete device is so light in weight and is held in position with such a light pressure that it is scarcely noticeable to the user and does not tend to irritate or to cause irritation.

As mentioned above, the frame 10 is relatively small and compact. For example, referring to Figures 3 and 4, the length A of frame 10 is 1½ inches, the depth B ⅝ inch, and the width C ⅞ inch. It is to be understood that these dimensions are given by way of example only.

As noted above, the filter pad 12 is held in position in light engagement with the user's nostrils solely by the frictional engagement with the frame 10. No clips or other securing devices are employed. Therefore, the user may change the filter pad 12 readily by merely grasping the frame 10 in one hand either by the web portion 16 or by the outer edges of the rims 14 and 15, moving the frame away from his nose against the tension of the elastic band and removing the used filter pad and positioning a new one against the frame with the other hand. The operation is completed by allowing the elastic band 11 to move the frame 10 and filter pad 12 into engagement with the nostrils.

Figures 5, 6 and 7 illustrate a modified form of my respirator which is used in the same manner as the form described above and consists of a frame 20 that may be composed of light metal, plastic or the like. The frame 20 is preferably formed in one piece and has a main portion 21 which is adapted to extend across and underneath the nostrils of the user, each end of the portion 21 being turned back or looped on itself as indicated at 22 in Figure 6. An elastic band 23 is secured to the looped ends 22 of the portion 21 as by knots 24 to hold the frame 20 in position beneath the nostrils. The portion 21 is provided with a fold 25 at its center to enable the frame to be grasped easily by the user. As shown particularly in Figure 6, the portion 21 is concave upwardly to conform to the general shape of the nose and is long enough to extend beyond the outer edges of the user's nostrils.

In order to assist in retaining the filter pad 12a in proper position, a pair of spaced finger portions 26 are provided; these are preferably integral with the main portion 21 and extend across it substantially midway between the looped ends 22 and the fold 25. Each finger 26 extends on either side of the portion 21 and is curved as shown in Figure 7 so as to present an upwardly convex surface. Since the frame is composed of light ductile material, the wearer may, if desired, bend the fingers 26 as well as the main portion 21 in order more comfortably to adapt the unit to his nose.

This form of the invention is used in the same manner as the previously described form. A pad 12a of filter material is inserted between the frame 20 and the user's nostrils to filter the air inhaled by the user; the elastic band 23 supported on the user's head in any convenient manner lightly holds the frame and filter pad in a proper position across the nostrils. The frame 20 holds the pad in place against the underside of the user's nose, the main portion 21 underlying the web of the nose and the outer edges of the nostrils while the end portions of fingers 26 underlie the edges of the nostrils near the lip and near the tip of the nose; thus the pad 12a is held in engagement with the edges of the nostrils at spaced points as in the previous modification. Also the upwardly concave main portion 21 and the upwardly convex fingers 26 conform comfortably to the user's nose and prevent accidental displacement of the device in a manner similar to the longitudinally concave and transversely convex frame 10 of the previously described modification. The fingers 26 and main portion 21 of the frame have relatively small width dimensions so as to offer minimum resistance to air breathed in by the user and yet afford adequate support for the filtering pad 12 with which the frame is used. The open spaces between the finger portions 26 permit air to be drawn into the nostrils in the same manner as through apertures 17 and 18 in frame 10. The modified respirator shown in Figures 5, 6 and 7 functions in a manner similar to the previously described unit to filter foreign matter from air and has the same advantages of light weight, small size, filtering effectiveness, economy of manufacture, ease of putting on and removing from the operator's head and adaptability for changing filter pads.

While any suitable thin sheet filtering material such as fine cotton gauze may be employed, I prefer to use filter material such as shown in Figure 8 of the drawings; this material comprises a pack 30 made up of very thin layers of substantially pure cellulose fibers in thin crepe paper form. The material known as crepe wadding is satisfactory. The material is cut to the desired size with a rather large number of layers, say 50 or 60, in each pack. The user may then separate as many layers as he desires from the complete pack to form a pad 12 for use in the respirator. For ordinary dust conditions, a filter pad made up of three layers may be sufficient. For more severe conditions, a pad comprising five or seven layers may be desired. Obviously it is easier to breathe through the thin pad, but thicker pads are more effective filtering media.

Regardless of the number of layers employed, the pad 12 is highly flexible. The individual layers are very thin and easily separated from each other, giving an extremely flexible structure. Such flexibility provides a valve action in the respirator, permitting the pad to be held without annoying pressure against the nostrils and making breathing easier. Thus, the flexible filter pad is effective as a filter as long as it is held close to the nostrils by the respirator frame, even though the pad may not be in engagement with the nostrils throughout breathing. The reason for this is that when the user inhales, the pad or at least the layer or layers thereof nearest the user's nostrils will be drawn into engagement with the edges of the nostrils, thus constraining substantially all of the air that passes into the nostrils to pass through and be filtered by the pad. When the user exhales, however, the pad may be deflected away from the nostrils inasmuch as the frame only underlies the edges of the nostrils at spaced points, permitting the pad to move away from the edges of the nostrils in regions where it is not held thereagainst by the frame, and also for the reason that the frame is held under such light pressure by the elastic band. Hence it is unnecessary for the user to exhale entirely through the pad and less effort in breathing is required than with devices in which the filter medium is completely sealed against the user's face. This advantageous mode of operation results from the use of thin flexible multi-layer pads which are not secured to the frame member in any way except by the action of the elastic band.

From the foregoing description of preferred forms of my invention, it will be evident that I have provided respirators, nasal filters or the like which can be manufactured at extremely low cost and which are efficient in operation. My devices are so compact and light that, after a short time, users are not aware of their presence. The filter pads are very inexpensive and can be changed with a minimum of effort in a very short time. The valve action resulting from the thin flexible filter pads 12 and the light engagement thereof with the user's nose permits much easier breathing than with other respirators. The amount of filtering action can be varied to suit the severity of the conditions. The device is so compact that it does not interfere with conversion nor does it block the user's vision.

Those skilled in the art will appreciate that various changes and modifications can be made in my invention without departing from the scope of the appended claims. It is therefore to be understood that the foregoing description of a preferred form of the invention is given by way of example and not by way of limitation.

I claim:

1. A respirator comprising a frame member providing closely spaced open areas, said respirator being adapted to be disposed against the nose of a user with the open areas beneath the user's nostrils, an elastic band adapted to be supported on the user's head and to urge the frame member toward the user's nostrils, and a thin flexible filter element overlying the open areas provided by the frame and adapted to be disposed between the frame and the adjacent portions of the user's nose and held in place solely by engagement between said frame and the user's nose.

2. A respirator comprising a frame member providing closely spaced open areas, said frame member being adapted to be disposed against the nose of a user with the open areas beneath the user's nostrils, said frame member having a central portion adapted to be disposed beneath the web of the user's nose, end portions projecting beyond the outside edges of the user's nostrils and intermediate portions adapted to be disposed beneath spaced points on the edges of the user's nostrils, said frame member being upwardly concave in a longitudinal direction and upwardly convex in a transverse direction, an elastic band secured to the end portions of said frame member, and a thin flexible filter element overlying the open areas provided by the frame and adapted to be disposed between the frame and the adjacent portions of the user's nose and held in place solely by engagement between said frame and the user's nose.

3. A respirator for filtering foreign matter from air drawn into the nostrils of a user, comprising a frame member having a pair of substantially identical rim portions, said rim portions each having an aperture and being spaced from each other by a web portion disposed between and connected to said rim portions, said rim portions being upwardly convex transversely of the frame and being bent toward each other about the web portion whereby the frame is upwardly concave longitudinally, said rim portions being adapted to be disposed beneath the end of the nose of the user with the apertures therein in registration with the user's nostrils, an elastic band connected to the frame member and adapted to be supported on the user's head for urging the frame member toward the user's nostrils, and filtering means disposed between the frame member and the user's nostrils and overlying the apertures in the frame for filtering air breathed in by the user, said filter element comprising a plurality of layers of thin porous material having width and length dimensions substantially larger than corresponding dimensions of said frame member whereby to overlap same and being held in place solely by frictional engagement between said frame member and the user's nose.

4. A respirator for filtering foreign matter from air drawn into the nostrils of a user, comprising a frame member providing a pair of closely spaced openings, said respirator being adapted to be disposed against the nose of a user with the openings in the frame member in registration with the user's nostrils, resilient means connected to the frame member and supported on the user's head for urging the frame member toward the user's nostrils, and a thin flexible filter element disposed between the user's nostrils and portions of said frame adjacent thereto and closing the openings in said frame, said filter element comprising a plurality of layers of thin porous material having width and length dimensions substantially larger than corresponding dimensions of said frame member whereby to overlap same and being held in place solely by frictional engagement with said frame member and the user's nose.

5. A respirator according to claim 4 wherein said filter element comprises a plurality of layers of thin porous light-weight cellulosic material, said layers of said material being readily separable from each other.

6. A respirator comprising a frame member having an upwardly concave longitudinal member, said longitudinal member having a pair of spaced transverse members extending therefrom, the spaces between said transverse members and said longitudinal member being open, said transverse members being upwardly convex.

7. A pack of filter material adapted to be separated into pads for use in a respirator for filtering foreign matter from air drawn into the nostrils of a user, said respirator including a frame member and resilient means connected thereto for holding the frame member near the user's nostrils, said pack comprising a plurality of thin flexible porous sheets of cellulosic material, said sheets in said pack being adapted to be easily separable from each other to form pads each embodying a lesser number of sheets than in said pad, said pad having width and length dimensions substantially larger than corresponding dimensions of the outer edges of the user's nostrils whereby to overlap the edges of the user's nostrils.

WILLIAM M. FOLBERTH.

REFERENCES CITED

The following references are of record in the file of this patent:

UNITED STATES PATENTS

| Number | Name | Date |
|---|---|---|
| 535,718 | Nagler | Mar. 12, 1895 |
| 1,221,778 | Wadhams | Apr. 3, 1917 |
| 1,297,337 | Feltner | Mar. 18, 1919 |